United States Patent [19]

Glotzbach

[11] 4,377,129

[45] Mar. 22, 1983

[54] APPARATUS FOR COATING MOVING STRIPS AND A METHOD FOR PRODUCING THE APPARATUS

[75] Inventor: Helmut Glotzbach, Leverkusen, Fed. Rep. of Germany

[73] Assignee: Agfa-Gevaert AG, Leverkusen, Fed. Rep. of Germany

[21] Appl. No.: 263,273

[22] Filed: May 13, 1981

[30] Foreign Application Priority Data

May 21, 1980 [DE] Fed. Rep. of Germany ....... 3019460

[51] Int. Cl.³ ...................... B05C 9/06; B23Q 17/00; B05C 5/02
[52] U.S. Cl. .................................... 118/412; 29/407; 29/447; 29/452; 29/526 R; 118/411; 118/410; 427/420
[58] Field of Search ..................... 29/447, 407, 526 R, 29/452; 118/412, 407, 411, 410; 427/420

[56] References Cited

U.S. PATENT DOCUMENTS

| | | | |
|---|---|---|---|
| 1,636,057 | 7/1927 | Jones | 29/447 |
| 1,839,850 | 1/1932 | Hodgkinson | 29/447 |
| 2,910,933 | 11/1959 | Danly | 29/447 X |
| 3,289,632 | 12/1966 | Barstow | 118/412 |
| 4,221,184 | 9/1980 | Gref et al. | 118/412 |

*Primary Examiner*—Shrive P. Beck
*Attorney, Agent, or Firm*—Connolly & Hutz

[57] ABSTRACT

The invention relates to an apparatus for coating moving strips with several layers, in particular for coating photographic films and papers with photographic emulsions and layers, the apparatus consisting of a coating block comprising several profiled parts screwed together by means of contraction anchors and the invention relates to a process for joining the profiled part together to form a coating block.

7 Claims, 5 Drawing Figures

APPARATUS FOR COATING MOVING STRIPS AND A METHOD FOR PRODUCING THE APPARATUS

This invention relates to an apparatus for coating moving strips with several layers, in particular for coating photographic films and paper with photographic emulsions and layers, the apparatus consisting of a casting block composed of several profiled parts screwed together.

The invention also relates to a method of joining the profiled parts together to form a coating block for coating moving strips, in particular, photographic films and paper, with a plurality of photographic emulsions and layers.

In the photographic industry, it has been customary for some time to coat lengths of paper and film with several layers simultaneously.

The various multi-layered coating processes used in the photographic industry include the cascade coating process, in which one or more liquid coating materials are made to flow simultaneously down an inclined surface and applied to the strip from a small distance (0.15 to 0.3 mm) between the pouring edge and the strip which moves past it. One such coating apparatus is described in U.S. Pat. No. 2,761,791.

The so-called curtain coating process is also assuming a position of some importance in the photographic industry. Two variations of the curtain coating process are known, the so-called slot coater and the so-called nozzle coater or sliding surface coater operating on the principle of the cascade coater. In the slot coaters, the coating material is discharged from the lower end of an outflow gap arranged transversely over the web which is to be coated, and immediately forms a curtain under free fall, and when the curtain reaches the web of material, it places itself on the surface of the web. In the nozzle coaters or sliding surface coaters, on the other hand, the coating material is forced through an outlet slot to reach an inclined sliding surface and flows down over this surface under gravity to reach the lower end thereof, which is curved in the form of a nozzle, and the free falling curtain is not formed until the material has left the lower end of the nozzle. The curtain of liquid may in both cases consist of one or more layers. A curtain coating process and an apparatus have been disclosed in U.S. Pat. No. 3,508,947. A more recent advantageous curtain coater has been disclosed in German Offenlegungsschrift No. 2,913,217.

Both casting blocks of cascade coaters and coating blocks of curtain coaters are required to meet very high standards of accuracy. In order to obtain an evenly coated film, it is particularly important that the inclined surface over which the coating material flows should be completely even and the edges of the extrusion gap over which the material flows should be completely horizontal. Even deviations of only a few $\mu$m are liable to cause streaks in the coating.

To manufacture the block consisting of profiled parts, the parts are first machined on milling machine tools and then screwed together. The assembled block is then microfinished and screwed to supporting brackets if indicated and the inclined flow surfaces and overflow edges are given a final finishing treatment on site. The block, which is equipped with tempering bores, is connected to a heat regulating system after assembly and adjusted to the operating temperature. Tempering is maintained without interruption during subsequent finishing and assembly of the apparatus.

A coating block composed of separate parts screwed together has been described in U.S. Pat. No. 3,289,632.

This construction and method of producing the coating block are found to have the disadvantage that the separate profiled parts shift out of place, so that edges which have been carefully finished to lie parallel are suddenly displaced by several $\mu$m. This may be attributed to the following causes:

1. The coating block must be repeatedly lifted and transported during the machining and finishing operations. It is thereby subjected to uncontrollable forces of torsion so that considerable shearing stresses are liable to be transmitted across the joints between the various parts, causing the displacements mentioned above.
2. When the coating block is screwed to the brackets, each screw exerts on the part to which it is connected a force which may be partly transmitted as shearing stress to the adjacent parts aross the joints, thereby causing displacements.
3. Particular attention must also be paid to the mounting of the block on the brackets. The surfaces on which the block lies are machined so that they are exactly parallel. The counter surfaces on the brackets must be equally parallel because the weight of the block will otherwise produce a twisting moment. This requirement is not easy to fulfill within the narrow tolerances which must be observed. Small errors in the parallelism of the surfaces on which the block lies are sufficient to cause unacceptable displacements due to torsion.

Similar standards of precision are required of the devices supporting the various parts during the operations in the workshop.

These undesirable displacements do not occur only during manufacture and assembly. A coating machine is frequently designed to coat in various widths. When a change in coating width is required, the coating block must be changed. This operation of changing the block, together with the necessary transport of the apparatus entail the same risk of deformation of the coating block as the original assembly but there is now the added difficulty that any displacements in the apparatus now require considerable production stoppages to correct them.

Brackets for mounting the individual parts are used for obtaining greater stability of the coating block. According to U.S. Pat. No. 4,221,184, for example, the various parts of the block are not only joined together with tension screws but in addition screwed to a torsion-free hollow support to form a unit. In this arrangement, the surfaces of contact of the casting block with the hollow support must be completely flat within very narrow tolerances because each screw used to fix the block to the support exerts a force on the part on which it is used. If there is only the slightest unevenness in the contacting surfaces, this force is transmitted as shearing stress to the adjacent individual parts through the joints and may therefore cause displacements of the individual parts in relation to each other although micro-finishing of the complete block is only carried out after the block has been assembled on the torsion-free hollow support.

Another disadvantage of known constructions using a bracket for the coating block is the static uncertainty of the forces in the coating block since the tension screws in the block act along lines of force which are perpendicular to those produced by the assembly screws used for mounting the block on the bracket.

It is also known to avoid displacements of the parts of the coating block by partly welding them together or to the bracket. This also has the effect that the tensions in the assembled block cannot be predetermined.

Moreover, welding has the considerable disadvantage that subsequent finishing work on one or more separate parts may become very difficult if not impossible. To secure the parts of the coating block stably to each other and to the bracket requires exceptionally large fixing screws which in turn require the individual parts of the block to be sufficiently large. In order to accommodate the tempering bores which are necessary, the individual parts must be of a size which is greater than is suitable for the coating process. This in turn entails longer flow surfaces for the coating solutions than is desirable. Since coating solutions react very sensitively to any surface disturbances as they flow over the surfaces of the apparatus, these surfaces should be as short as possible.

The development of new coating processes and new photographic materials leads to an ever increasing number of layers, of as much as 9 or more, which are to be applied to the film or paper in a single operation. Due to the large number of separate parts which are therefore required in the coating apparatus, the dimensions and weight and hence also the difficulties mentioned above increase disproportionately.

Apart from the difficulties in the manufacture of such coating blocks, technical problems arise when working with such coating blocks due to their great weight. In order to keep production losses low when joints or faults appear in the length of film, cascade coaters are moved away from the film for a short time when such faults occur and then returned (removal and return). If the film moves at high speed, therefore, and if the coating block is heavy, the times for removal and return are long and the losses in material are correspondingly high.

When screwing together a large number of parts to form a coating block, the use of sufficiently large tightening screws entails a considerable number of uncertainty factors.

1. It is virtually impossible to calculate in advance the tensions produced in the screws. The tightening moment $M_{ges}$ transmitted from a spanner to a nut is given by the equation $$M_{ges} = M_R + M_G + M_E$$

where
 $M_R$ = the moment required to overcome the friction on the surface of contact with the nut,
 $M_G$ = the moment required to overcome the friction in the thread and
 $M_E$ = the effective moment for producing the force of traction in the screw.

Of these three moments, only $M_E$ can be accurately calculated. The other moments $M_R$ and $M_G$ depend on factors of friction which may vary within wide limits. Since, however, $M_R$ and $M_G$ make a major contribution to the total moment $M_{ges}$ the calculation is very unreliable if not useless.

2. The moments $M_G$ and $M_E$ act on the screw shank so that the shank is subjected to the double stress of tension and torsion. The maximum possible force of traction for a given cross section of screw shank is thereby considerably reduced.

3. The torque in the screws also has a disadvantageous effect on the tensions in the coating block since tensions composed of pressure and torsion act on the block. Since the proportion made up of torsion is very high, coating blocks undergo a measurable amount of twist, particularly if they are inferior in construction and therefore have only a small moment of resistance, and this twist in the blocks renders them unusable for the production of high quality photographic materials.

4. If the blocks are made more rigid by means of brackets, the weight is considerably increased, with the result that the various tensions in the block and therefore the total moment of traction $M_{ges}$ required for tightening the nuts cannot be calculated. Brackets cannot be used in a curtain coater as described in German Offenlegungsschrift No. 2,913,217 because in this V-shaped casting block the coating solutions leave through extrusion gaps on both sides.

It is an object of the present invention to provide an apparatus and a process for the manufacture of an apparatus of the type defined above by means of which the coating block can easily be kept small and light and hence the flow surface short, the individual parts of the block can easily be kept small and joined together, the forces inside the block can be calculated and the block can easily be assembled and dismantled.

Starting from an apparatus of the type mentioned initially, the problem according to the invention is solved by providing contraction anchors for joining the parts of the block together.

It is surprisingly found that by using contraction anchors for assembling the parts of a coating block, means have been found for obtaining an ideal form of coating block which moreover is easily assembled. Due to the pure tension force which the contraction anchor exerts on the individual parts, the parts can be kept small and securely and firmly joined together by means of relatively thin contraction anchors. The forces of tension in the anchors can be accurately predetermined since no moments of torsion and no frictional forces are produced. Assembly and dismantling are extremely simple and secure since they are achieved simply by heating the contraction anchors.

To a man in the art it was surprising to find that the extrusion gaps between the individual parts preserve their parallelism under the influence of the high contraction forces and do not vary even with excessive coating widths. It is also surprisingly found that inspite of the high forces in the contraction anchor, no irregular constrictions in the extrusion gaps are produced in the vicinity of the contraction anchors.

By joining the parts of the block together by means of contraction, they can be pressed together to form a block with a very accurately calculated amount of force so that the block is substantially insensitive to jolts or other forces acting on it from outside. The final planing finishing work on the block and transport of the block can be carried out without requiring special precautions. No bracket is required since not even the under surface of the coating block need be very finely finished.

According to another advantageous embodiment, the contraction anchors have a central bore for a heating fluid.

It is particularly advantageous to provide the contraction anchors with bores extending along their length, into which electric heating rods may be introduced to elongate the contraction anchors by heating. This provides a very simple means of heating the contraction anchors to the necessary temperature for their elongation in a short time.

In another embodiment, the contraction anchors have continuous central bores with connecting means for the conduction of heating fluids such as steam, gas or liquids at the ends of the bores. The connecting means may consist of screw threads or cones worked into the anchors. The continuous bores may also be used for the passage of cooling fluid to accelerate the contraction process by cooling the contraction anchors more rapidly.

In one suitable embodiment, the annular spaces surrounding the contraction anchors in the coating block may be used as tempering bores when coating tapes. For this purpose, these cavities are joined together by inflow and outflow channels for a tempering liquid.

For obtaining a uniform distribution of contact pressure, it has been found advantageous to adjust the surface areas of the pressure surfaces of the parts of the block above and below the mid-line of the contraction anchor by working additional openings into the lower half of the coating block so that equal spring values are obtained on both sides of the midline.

A process according to the invention for joining the profiled parts together to form a coating block is characterised in that:

(a) the parts of the block are micro-finished on their inner surfaces before they are joined together to form a block;

(b) the coating block is assembled from the individual parts and the nuts are screwed only so tightly on to the contraction anchors that the individual parts can still be shifted along their surfaces to adjust their positions so that there is a smooth transition from one inner surface to the next;

(c) when the individual parts have been correctly aligned, the nuts on the contraction anchors are uniformly tightened with a torque wrench to tension the anchor with a small torque, and the position of the nuts in relation to the individual parts is marked;

(d) every second contraction anchor is heated and the nuts are tightened through a previously calculated angle;

(e) when the first set of contraction anchors has cooled, the other contraction anchors are heated and their nuts are tightened through the same angle, and (f) the coating block is finally finished by microfinishing the flow surfaces for the coating solution.

By this process it is surprisingly simple to ensure that each coating block consisting of individual profiled parts can be securely and firmly pressed together with an accurately precalculated amount of force so that shifting of the individual parts out of position is impossible. The contraction anchors do not introduce any forces into the coating block by friction or by torsion but only pure tension forces. Assembly and dismantling are very simple by this process and can be carried out accurately.

The process is suitable for joining together any coating blocks composed of separate parts.

The invention will now be explained in more detail with reference to drawings, in which.

Figure 1:
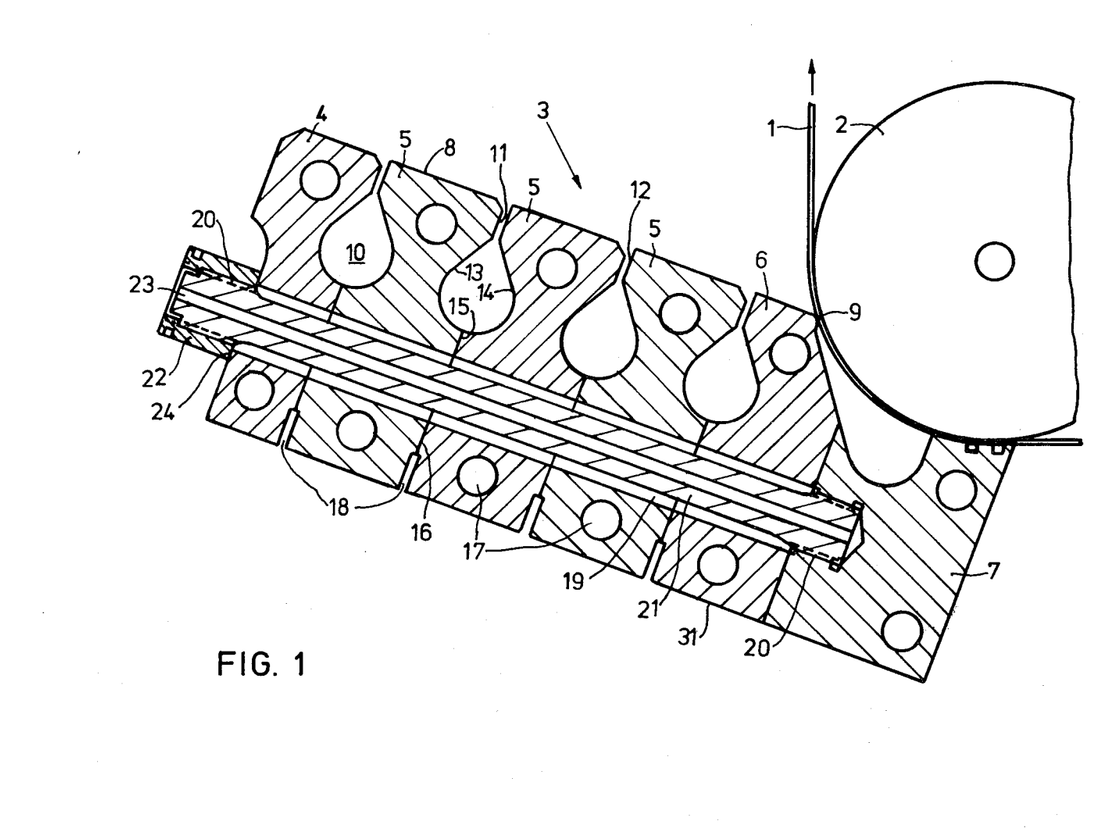
FIG. 1 is a cross section through a coating block of a cascade coater for uniformly applying four layers to a film, comprising contraction anchors in the form of stay bolts.

FIG. 1 shows a cross section through a coating block of a cascade coater 3. The web of film or paper 1 to be coated is carried over an applicator roller 2 and moved at a small distance in front of the coating lip, 9 of the cascade coater 3 to receive the layers. The individual layers are formed by forcing the various liquids for forming the layers into distribution chambers 10 by means of pumps and pipes (not shown) and delivering them to the flow surfaces 8 through extruder slots formed by the wall surfaces 11, 12 of the parts 4, 5, 6. The individual layers of liquid then flow under gravity down the flow surfaces 8 as films, are placed one above the other on the flow surfaces and reach the coating lip, 9 on the lower part 6 to be transferred to the film 1.

Uniform coating of the film 1 with a plurality of layers is, however, only possible if the flow surfaces 8 and the surfaces 11, 12 of the extruder slots are in exact correspondence. If the slots or flow surfaces 8 differ in parallelism by only a few $\mu$m, the thicknesses of the layers of film will be non-uniform so that, for example, in colour films the colour differences of the cast layers of colour photographic images will be considerable.

The cascade coaters 3 are composed of a plurality of parts 4 to 7. The cascade coater illustrated in FIG. 1 has an upper part 4 followed by n-1 identical parts 5, the number depending on the number of layers n to be coated, a lower part 6 with coating lip 9 and an under pressure part 7 for coating.

Intercommunicating tempering bores 17 are worked into the coating block. A heating fluid flows through them so that the whole casting block is uniformly tempered.

Before the coating block 3 is assembled, the individual parts 4, 5, 6 and 7 are micro-finished on their internal surfaces 11, 12, 13, 14, 15, and 16. The tempering bores 17 are also finished before assembly. The coating block 3 is assembled from these parts 4–7 (FIG. 1), the contraction anchor 21 is screwed into the part 7, and the nuts 22 on the threads 20 of the contraction anchors 21 are lightly tightened against the part 4 so that the parts 4–7 can still be shifted along their surfaces 15, 16 under a light pressure to align them. This alignment of the parts 4–7 is carried out in such a manner that the surfaces 13, 14 of the distribution chambers 10 for the coating solution extend from one to the other without a step.

After adjustment of the position of the parts 4–7, the nuts 22 are tightened more firmly on the contraction anchors 21 by means of a torque wrench. The torque produced is chosen to be very small in proportion to the dimensions of the thread of the contraction anchor 21 and only sufficient to enable the anchor 21 to be put under a light, predetermined tension so as to ensure that the contact pressure surfaces 15, 16 between the parts 4–7, the contact surfaces 24 with the nuts, and the threads 20 of the contraction anchors 21 no longer have any clearance.

The nuts are then in their starting position for contraction of the anchors 21. The position of the nuts 22 in relation to the upper part 4 is marked, for example, by a scribed line. The tightening angle through which the nuts 22 must be turned is calculated from the desired contact pressure and may also be marked on the upper part as the end position of the nuts 22.

The contraction anchors 21 are then heated to lengthen them. It is preferable not to heat all the contraction anchors 21 at the same time, in order to avoid displacement of the aligned parts 4–7 in relation to each other. Heating of the contraction anchors 21 is therefore carried out in two stages. First, only every second anchor 21 is heated and the nuts 22 are turned through the previously calculated, marked angle, and when the first set of anchors 21 has cooled, the other anchors are heated and their nuts 22 are turned through the tightening angle.

Since the length of the contraction anchors 21 has increased by heating, the nuts 22 can be turned or tightened without any expenditure of force. When the contraction anchors 21 have been sufficiently heated, the nuts can be turned by hand through the required, precalculated angle.

When all the anchors 21 have cooled, assembly of the coating block 3 is complete. Since the contraction anchors 21 have become shorter again by cooling, the contact surfaces 15, 16 of the parts 4–7 are firmly and securely pressed together by pure traction, so that displacement of the individual parts is virtually impossible.

There are various possible ways of heating the contraction anchors 21. A solid contraction anchor is limited in these possibilities since heating of the anchor from outside depends of the thermal conductivity and if the heating time is prolonged, the parts 4–7 will also be heated. Inductive heating of the contraction anchor with electrical energy is then more suitable.

Heating of the contraction anchors 21 by means of electrical heating rods has been found according to the invention to be very simple and advantageous solution. The contraction anchors 21 are provided for this purpose with bores 23 into which the heating rods are introduced (FIG. 1).

Figure 2:
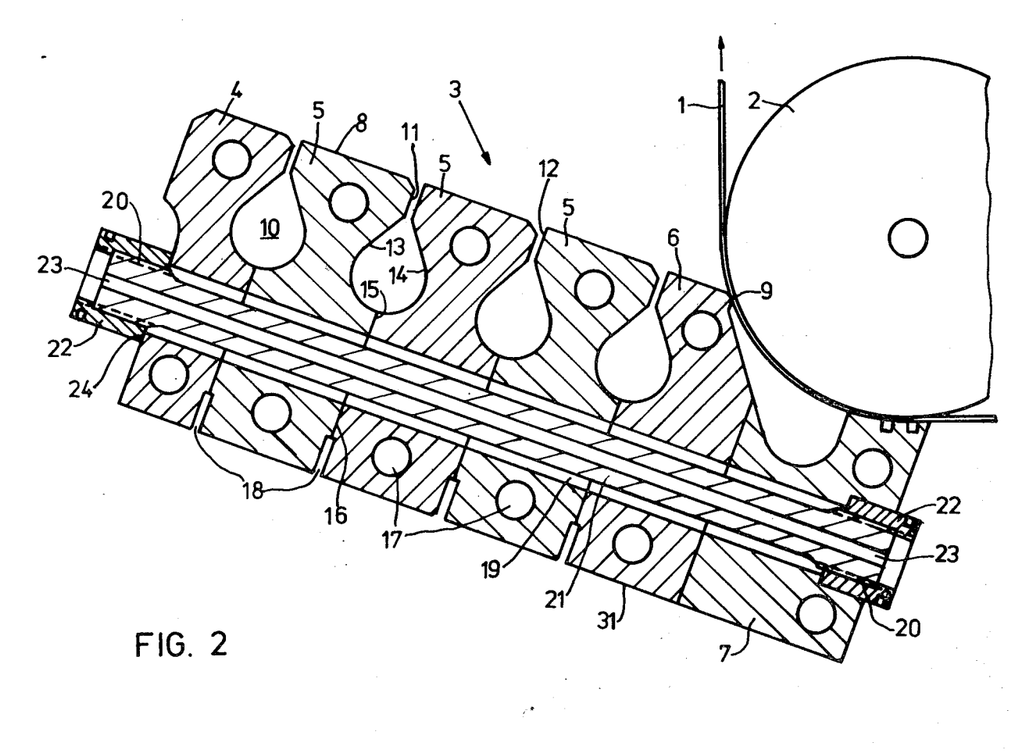
FIG. 2 shows the same cascade coater equipped with shrinkage anchors which have nuts at both ends.
Figure 3:
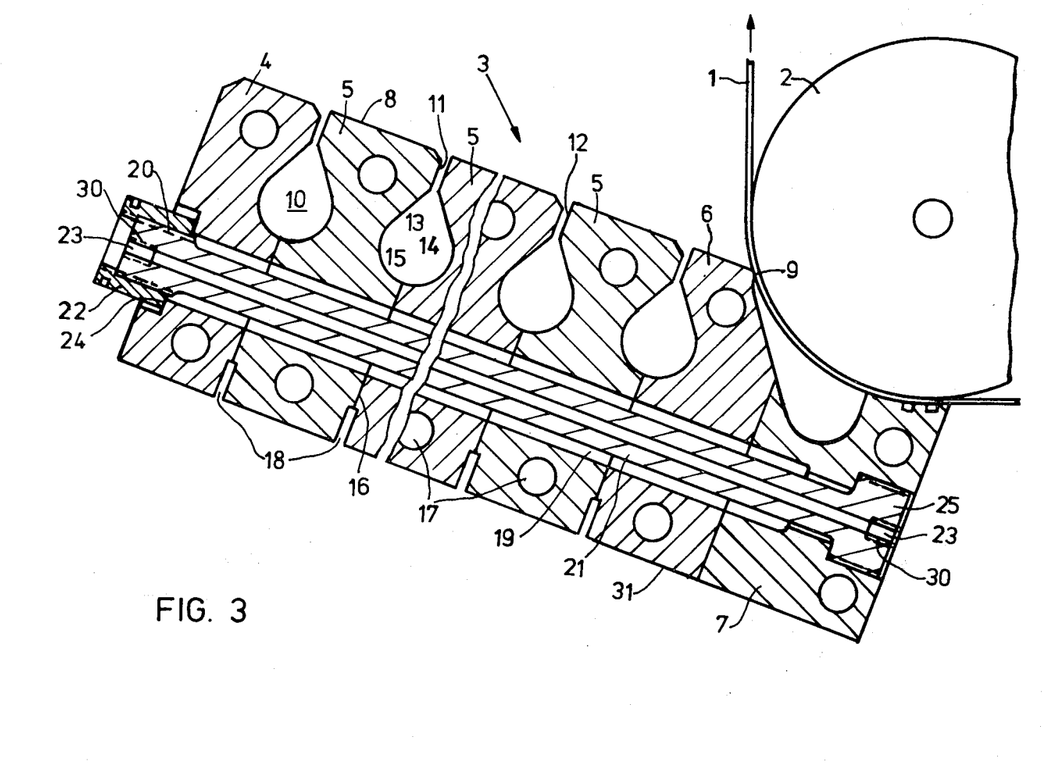
FIG. 3 shows a cascade coater for simultaneously applying four to twelve layers, equipped with contraction anchors which have a head at one end.

In one advantageous embodiment of the coating block, the bores 23 in the contraction anchors 21 are accessible from both ends (FIGS. 2 and 3). In FIG. 2, nuts 22 are provided at both ends for supporting the contraction anchor 21, whereas in FIG. 3, in another embodiment of the casting block 3, stay bolts with a head 25 are used as contraction anchors 21. In the forms of coating blocks according to FIG. 2 and 3, the contraction anchors 21 can be rapidly cooled after heating and tightening of the nuts 22 by conducting air or some cooling fluid through the bores 23 of the contraction anchor.

The contraction anchors 21 may also be heated with gas, steam or liquids if suitable inlets and outlets are connected to the bores 23 at both ends. The bores 23 may be provided with internal threads 30 or cones for connections (FIG. 3).

It was surprising to a man in the art to find that the extrusion gaps which are formed by the surfaces 11 and 12 of the parts 4–7 and may have a length of 2 meters or more transversely to the direction of flow of the coating solution maintain their parallelism over the whole width of the coating block under the action considerable contraction forces. This, however, is only the case if the coating block is so designed that the surface areas of the contact pressure surfaces 15 and 16 and the cross sections of the parts 4–7 produce equal spring values in the upper and lower halves of the block, with reference to the mid-line of the anchor 21, so that no bending of the coating block occurs under the influence of the contraction forces. These surface areas are made equal for forming additional recesses 18 in the lower half of the coating block 3. These recesses 18 are worked into the block until the areas of the surfaces 15 and 16 are such that the spring values of the blocks are equal.

In FIG. 3 is illustrated a coating block 3 for a cascade coating process, consisting of a number of parts 4–7 varying according to the required number of layers which are to be formed. Colour photographic films and paper have a considerable number of individual layers, e.g. 9 or 12, which are applied to a length of film or paper 1 in a single operation. For such a large number of layers, the coating block 3 can be extended by using additional middle pieces 5. For a cascade coater used for coating 9 layers, 8 equal parts 5 are inserted between the upper part 4 and the lower part 6 and pressed together with contraction anchors 21 of suitable length.

Figure 4:
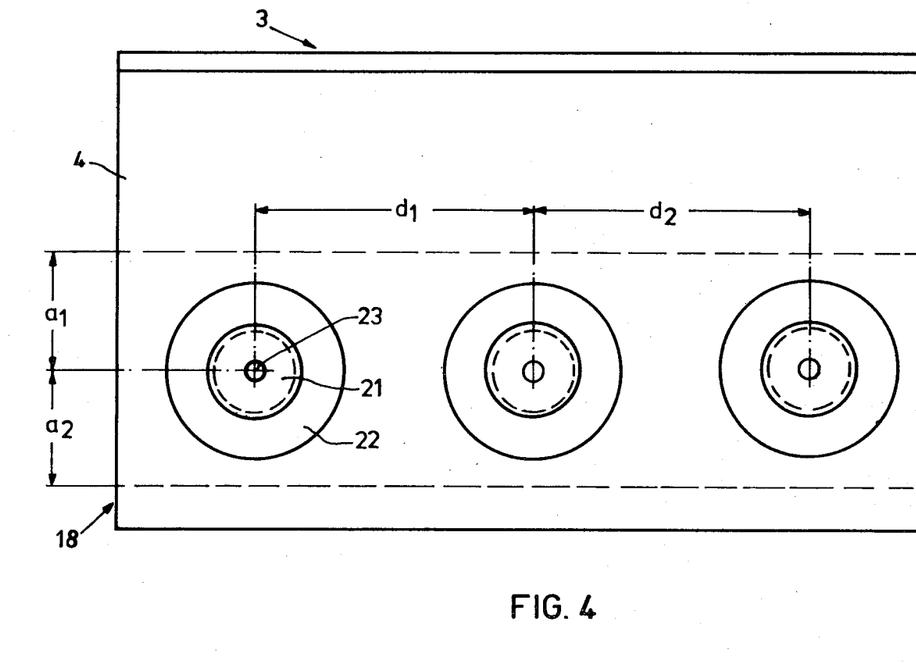
FIG. 4 is an elevational view of side A of the coating block of FIG. 3.

FIG. 4 is an elevational view of side A of the coating block 3 of FIG. 3. The distances between the centres, $d_1, d_2, d_3 \ldots$ are chosen so that each contraction anchor 21 is opposite an equal cross sectional portion of the coating block 3. By suitable choice of the depth of the additional recesses 18, the surface areas of the contact pressure surfaces above the horizontal mid-line ($a_1$) passing through the contraction anchors 21 are such that the spring values above the mid-line are equal to those below the mid-line ($a_2$).

It is surprisingly found that the high forces in the contraction anchors produce no narrowing of the extrusion gap in the vicinity of the anchors 21 if the distances $d_1, d_2, d_3 \ldots$ between the centres of the contraction anchors 21 are not too great.

The annular cavities 19 (FIGS. 1 to 3 and 5) between the coating block 3 and the contraction anchors 21 may advantageously be used as tempering bores by joining them together through inflow and outflow channels. This simplifies the construction of the coating block 3 since at least some of the tempering bores 17 may be dispensed with.

Dismantling of the coating block 3 is as simple as the assembly described above. To dismantle the block, electric heating rods are introduced into the bores 23 of the contraction anchors 21 and the anchors 21 are elongated until the nuts 22 can easily be loosened. Dismantling may be necessary for working on surfaces 11 to 16 which are not accessible from outside or for converting an existing coating block 3 into a block comprising a larger or smaller number of parts 5.

After each assembly of a coating block 3, the flow surfaces 8 for the coating solutions are machined and then micro-finished. It is found that when a coating block 3 is held together by the contraction connection according to the invention using contraction anchors, it is pressed together so firmly with a precalculated force that it is substantially insensitive to jolts and other forces acting from outside. Even the final planing finishing work on the block and transport can be carried out without special precautions.

Another advantage of the coating apparatus according to the invention is that the underside 31 of cascade coater 3 (FIGS. 1, 2, 3) require no micro-finishing work since no bracket is used. The coating block may be directly fixed to the coating frame by a three point bearing.

The coating block 3 of a cascade coater described in the text and illustrated in FIGS. 1 to 4 only constitute examples. The contraction connection with contraction anchors 21 may be carried out on any known coating block composed of several parts for multilayered coating and thus provides the possibility of coating apparatus which are advantageously light in weight and with short flow surfaces 8 and without heavy brackets or girder supports.

Figure 5:
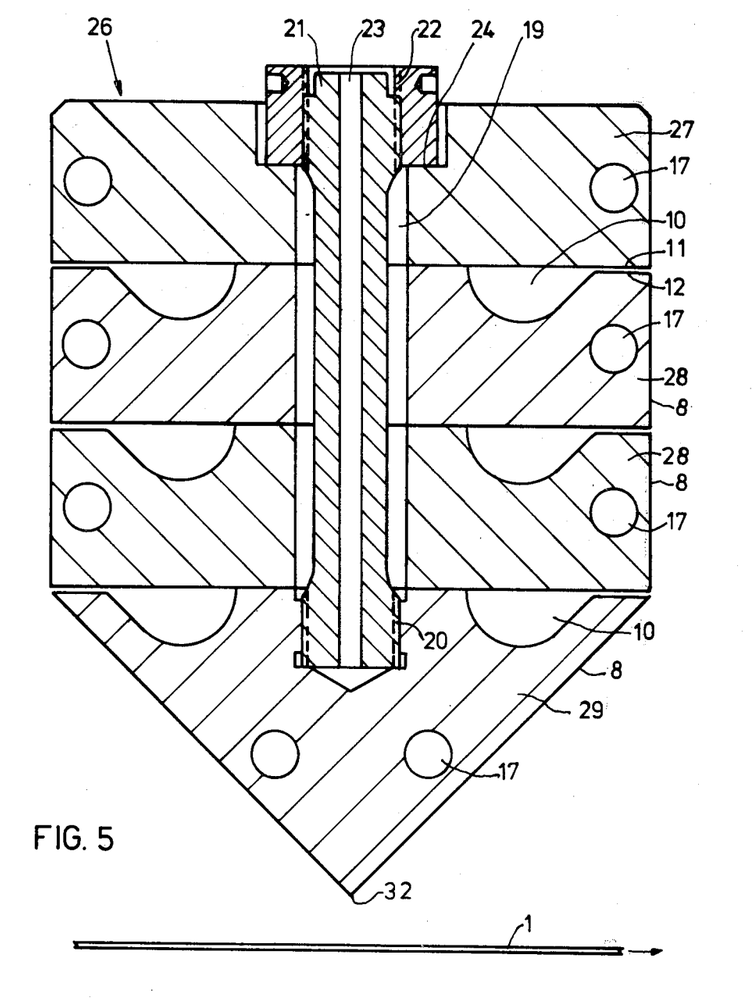
FIG. 5 is a cross section through a coating block of a curtain coater for the simultaneous application of six layers to a film, in which the contraction anchors are in the form of stay bolts.

In FIG. 5 is illustrated a coating block 26 for a curtain coating process, in which the parts 27 to 29 are again advantageously joined and pressed together by contraction anchors 21. In this curtain coater for the simultaneous coating of a web film or paper with 6 layers, the liquids for coating leave the 6 distribution chambers 10 through the extrusion slots formed by the surfaces 11 and 12 and flow one over the other on the flow surfaces 8 to combine at the lower tip 32 of the V-shaped coating block 26. These 6 layers then descend under free fall as a curtain to reach the moving web 1 below them, where they are located as coatings.

This curtain coater 26 is assembled in the same manner as described with reference to FIG. 1. The connection by means of two nuts 22 (FIG. 2) or stay bolts with head (FIG. 3) is not possible in this case. Since the contraction anchor 21 also cannot be provided with a bore 23 accessible from both sides due to the construction and function of the coating apparatus, the annular cavities 19 may be joined together by channels to cool the heated contraction anchor and may at the same time be used as tempering cavities during production periods of the coating apparatus.

I claim:

1. Process for joining the profiled parts together to form a coating block for coating moving strips with photographic emulsions and layers, including the steps wherein,
    (a) individual parts of a coating block are micro-finished on their inner surfaces before the parts are joined together to form the coating block,
    (b) a coating block is formed by joining together the individual parts with contraction anchors having nuts on the contraction anchors which are tightened only to such an extent that the parts can be adjusted in position along their inner surfaces so that their surfaces are smoothly continuous one into the other,
    (c) after alignment of the parts, the nuts on the contraction anchors are uniformly tightened with a torque wrench to tension the contraction anchors with a small torque, and the positions of the nuts in relation to the parts are marked,
    (d) and then first, every second contraction anchor is heated and the nuts are turned to tighten them further through a previously calculated angle,
    (e) after cooling of the first contraction anchors, second the other contraction anchors are heated and their nuts are turned forwards by the same tightening angle, and
    (f) to complete the coating block, the flow surfaces for the coating solutions are micro-finished.

2. Apparatus for coating moving strips of photographic films and papers with photographic emulsions and layers,
    wherein a coating block is comprised of
    several profiled parts screwed together having gap openings formed by said screwed parts,
    a plurality of contraction anchors joining said parts together,
    each anchor joining together at least two parts so that said gap openings are formed by the parts joined together by said contraction anchors and each anchor joining together the respective parts produce contact pressure between contact surfaces of said joined together parts,
    said contraction anchors and said joined parts being so constructed and arranged that each of the contraction anchors is opposite an equal cross-sectional portion of the coating block,
    so that the spring valves in the parts of the block above and below the mid-line of the contraction anchors are equal.

3. Apparatus according to claim 2, characterized in that the contact surfaces of the parts of the coating block above the midline of the contraction anchors containing the distribution chambers for the photographic emulsions and the parts of the block below the mid-line of the contraction anchors are adjusted in size by additional recesses formed in the lower half of the coating block to compensate the slits utilized for the distribution chambers, so that the spring values in the parts of the block above and below the mid-line of the contraction anchors are equal.

4. Apparatus according to claim 2, characterised in that the contraction anchors have central bores for accommodating a heating means.

5. Apparatus according to claim 2, characterised in that the contraction anchors are provided with bores along their length, and electric heating rods can be inserted into the bores, which rods are heated to elongate the contraction anchors.

6. Apparatus according to claim 2, characterised in that the contraction anchors have central bores forming through passages, and connecting means are provided at the ends of the bores of the contraction anchors for the passage of heating or cooling means such as steam, gas or liquids.

7. Apparatus according to claim 2, characterised in that the annular cavities situated around the contraction anchors in the coating block may be used as tempering bores when coating strips and are joined together by inflow and outflow channels for a tempering liquid.

* * * * *

UNITED STATES PATENT AND TRADEMARK OFFICE
CERTIFICATE OF CORRECTION

PATENT NO. : 4,377,129

DATED : March 22, 1983

INVENTOR(S) : Helmut Glotzbach

Page 1 of 2

It is certified that error appears in the above-identified patent and that said Letters Patent is hereby corrected as shown below:

The title page should appear as shown on the attached sheet.

*Signed and Sealed this*

*Twenty-second* Day of *November 1983*

[SEAL]

*Attest:*

*Attesting Officer*

GERALD J. MOSSINGHOFF

*Commissioner of Patents and Trademarks*

United States Patent

Glotzbach

[11] 4,377,129
[45] Mar. 22, 1983

[54] APPARATUS FOR COATING MOVING STRIPS AND A METHOD FOR PRODUCING THE APPARATUS

[75] Inventor: Helmut Glotzbach, Leverkusen, Fed. Rep. of Germany

[73] Assignee: Agfa-Gevaert AG, Leverkusen, Fed. Rep. of Germany

[21] Appl. No.: 263,273

[22] Filed: May 13, 1981

[30] Foreign Application Priority Data

May 21, 1980 [DE] Fed. Rep. of Germany ...... 3019460

[51] Int. Cl.³ ............... B05C 9/06; B23Q 17/00; B05C 5/02
[52] U.S. Cl. .................. 118/412; 29/407; 29/447; 29/452; 29/526 R; 118/411; 118/410; 427/420
[58] Field of Search .............. 29/447, 407, 526 R, 29/452; 118/412, 407, 411, 410; 427/420

[56] References Cited

U.S. PATENT DOCUMENTS

| | | | |
|---|---|---|---|
| 1,636,057 | 7/1927 | Jones | 29/447 |
| 1,839,850 | 1/1932 | Hodgkinson | 29/447 |
| 2,910,933 | 11/1959 | Danly | 29/447 X |
| 3,289,632 | 12/1966 | Barstow | 118/412 |
| 4,221,184 | 9/1980 | Gref et al | 118/412 |

*Primary Examiner*—Shrive P. Beck
*Attorney, Agent, or Firm*—Connolly & Hutz

[57] ABSTRACT

The invention relates to an apparatus for coating moving strips with several layers, in particular for coating photographic films and papers with photographic emulsions and layers, the apparatus consisting of a coating block comprising several profiled parts screwed together by means of contraction anchors and the invention relates to a process for joining the profiled part together to form a coating block.

7 Claims, 5 Drawing Figures